(12) United States Patent  (10) Patent No.: US 12,478,460 B1
Ruan  (45) Date of Patent: Nov. 25, 2025

(54) ELECTRIC TOOTHBRUSH HEAD AND MANUFACTURING METHOD THEREOF

(71) Applicant: Qiang Ruan, Guangdong (CN)

(72) Inventor: Qiang Ruan, Guangdong (CN)

( * ) Notice: Subject to any disclaimer, the term of this patent is extended or adjusted under 35 U.S.C. 154(b) by 0 days.

(21) Appl. No.: 18/816,150

(22) Filed: Aug. 27, 2024

(51) Int. Cl.
*A61C 17/22* (2006.01)
*B29C 45/00* (2006.01)
*B29L 31/42* (2006.01)

(52) U.S. Cl.
CPC ........ *A61C 17/222* (2013.01); *B29C 45/0062* (2013.01); *B29L 2031/425* (2013.01)

(58) Field of Classification Search
CPC .... A61C 17/222; A61C 17/34; B29C 45/0062
See application file for complete search history.

(56) References Cited

U.S. PATENT DOCUMENTS

| | | | |
|---|---|---|---|
| 2022/0071380 A1* | 3/2022 | Huang | A46B 5/0095 |
| 2023/0140465 A1* | 5/2023 | Johnson | A61C 17/222 |
| | | | 15/22.2 |

FOREIGN PATENT DOCUMENTS

WO WO-2022137948 A1 * 6/2022

* cited by examiner

*Primary Examiner* — Shay Karls
(74) *Attorney, Agent, or Firm* — ScienBiziP, P.C.

(57) ABSTRACT

An electric toothbrush head includes a connecting cavity, a connecting part, bristles, and a main body of toothbrush head. The connecting cavity is positioned in an inner cavity, and the connecting cavity is integrally formed by injection molding. A first insertion channel is surrounded and formed by a side wall of the connecting cavity. The first insertion channel is used for insertion of a drive shaft of an electric toothbrush. The main body of toothbrush head is connected to the bristles. The main body of toothbrush head is connected to the connecting cavity through the connecting part. The main body of toothbrush head and the connecting part are integrally formed by injection molding. When the main body of toothbrush head is formed by injection molding, at least one part of the main body of toothbrush head is attached to the connecting cavity to form the connecting part.

18 Claims, 10 Drawing Sheets

S10 — Providing a first plastic body and a first mold, wherein the first plastic body is injected into the first mold and solidified to form a connecting cavity, a side wall of the connecting cavity surrounds and forms a first insertion channel, and the first insertion channel is used for insertion of a drive shaft of an electric toothbrush;

S11 — Providing a second mold, wherein the second mold is equipped with a positioning slider pin, the connecting cavity is taken out from the first mold and put into the second mold, and the positioning slider pin is inserted into the first insertion channel;

S12 — Providing a second plastic body, wherein the second plastic body is injected into the second mold, at least one part of the second plastic body is attached to the connecting cavity to form an attachment part, the second plastic body is solidified to form a main body of toothbrush head, the attachment part is solidified to form a connecting part, the main body of toothbrush head is connected to the connecting cavity through the connecting part, so that the main body of toothbrush head encloses the connecting cavity;

S13 — Detaching the main body of toothbrush head and the connecting cavity from the second mold and the positioning slider pin to obtain a toothbrush rod;

S14 — Providing bristles, wherein the bristles are installed onto the toothbrush rod to obtain the electric toothbrush head.

FIG. 10

ELECTRIC TOOTHBRUSH HEAD AND MANUFACTURING METHOD THEREOF

TECHNICAL FIELD

The present invention relates to the field of electric toothbrushes, particularly to an electric toothbrush head and a manufacturing method for an electric toothbrush head.

BACKGROUND ART

In daily life, the application of automatic cleaning and care devices is becoming increasingly widespread, and electric toothbrushes can more conveniently and effectively clean teeth. Electric toothbrushes typically clean teeth via high-speed vibration, with different vibration modes and intensities. Currently, the main vibration methods used by electric toothbrushes on the market include rotational vibration, sonic vibration, ultrasonic vibration, etc.

Most electric toothbrushes can be divided into replaceable toothbrush heads and drive shafts. Existing electric toothbrushes mostly require additional connectors to connect the toothbrush head to the drive shaft, so that the mechanical movement on the drive shaft is transmitted to the toothbrush head to achieve high-frequency vibration of the toothbrush head, thereby achieving an effect of cleaning teeth. However, existing connection methods on the market are not only complex in installation, but also not tight enough in the connection between the drive shaft and the toothbrush head. When the electric toothbrush vibrates at high frequencies, a loud noise will be produced during the transmission of the high-frequency vibration to the toothbrush head by the mechanical movement of the drive shaft.

SUMMARY

In order to overcome the shortcomings of the prior art, an electric toothbrush head is provided in the present invention. The electric toothbrush head includes a connecting cavity, a connecting part, bristles, and a main body of toothbrush head.

The connecting cavity is integrally formed by injection molding. A first insertion channel is surrounded and formed by a side wall of the connecting cavity. The first insertion channel is used for insertion of a drive shaft of an electric toothbrush.

The main body of toothbrush head is connected to the bristles. The main body of toothbrush head is connected to the connecting cavity through the connecting part. The main body of toothbrush head and the connecting part are integrally formed by injection molding. When the main body of toothbrush head is formed by injection molding, at least one part of the main body of toothbrush head is attached to the connecting cavity to form the connecting part.

As an improvement of the present invention, the electric toothbrush head further includes a first plastic body, and the connecting cavity is formed by injection molding and solidifying the first plastic body. The electric toothbrush head also includes a second plastic body, and the main body of toothbrush head is formed by injection molding and solidifying the second plastic body. At least one part of the second plastic body is attached to the connecting cavity to form an attachment part. The attachment part is solidified with the main body of toothbrush head to form the connecting part.

As an improvement of the present invention, a melting point of the connecting cavity is greater than a melting point of the main body of toothbrush head and a melting point of the connecting part.

As an improvement of the present invention, a melting point of the first plastic body is greater than a melting point of the second plastic body.

As an improvement of the present invention, the main body of toothbrush head is provided with a first accommodating cavity and a first mounting opening. The first mounting opening is in communication with the first accommodating cavity, and the first accommodating cavity is surrounded and formed by a side wall of the main body of toothbrush head. The connecting part is positioned on an inner surface of the first accommodating cavity, the connecting cavity is positioned inside the first accommodating cavity, and the connecting cavity is connected to the inner surface of the first accommodating cavity through the connecting part. The first mounting opening is in communication with the first insertion channel.

As an improvement of the present invention, the connecting cavity is equipped with an elastic wall, and an inner surface of the elastic wall is used for clamping the drive shaft of the electric toothbrush in the first insertion channel.

As an improvement of the present invention, the inner surface of the elastic wall is provided with a first locking protrusion.

As an improvement of the present invention, the first insertion channel includes a relatively narrow front portion and a relatively wide back portion, so that a narrower first insertion part is formed at a front end of the first insertion channel, a wider second insertion part is formed at a rear end of the first insertion channel, and an inner diameter of the second insertion part is greater than an inner diameter of the first insertion part.

As an improvement of the present invention, the first insertion channel also includes a third insertion part. The third insertion part is positioned between the first insertion part and the second insertion part. An inner diameter of the third insertion part is greater than the inner diameter of the first insertion part, and the inner diameter of the third insertion part is smaller than the inner diameter of the second insertion part.

As an improvement of the present invention, the inner surface of the elastic wall is provided with a first locking protrusion. The first locking protrusion is positioned on an inner surface of the first insertion part.

As an improvement of the present invention, the inner surface of the elastic wall is also provided with a first position limiting protrusion and a second position limiting protrusion. The first locking protrusion, the first position limiting protrusion, and the second position limiting protrusion are used for clamping the drive shaft of the electric toothbrush in the first insertion channel.

As an improvement of the present invention, a first avoidance groove is defined between the first position limiting protrusion and the second position limiting protrusion.

As an improvement of the present invention, the first position limiting protrusion, the second position limiting protrusion, and the first avoidance groove all extend between the first insertion part, the second insertion part, and the third insertion part.

As an improvement of the present invention, the first position limiting protrusion includes a relatively high front portion and a relatively low back portion. A front end of the first position limiting protrusion is positioned at the first insertion part. The second position limiting protrusion includes a relatively high front portion and a relatively low back portion. A front end of the second position limiting protrusion is positioned at the first insertion part.

As an improvement of the present invention, the connecting cavity is also provided with an avoidance hole position. The avoidance hole position is in communication with the first insertion channel, and the first insertion part is positioned between the avoidance hole position and the third insertion part.

As an improvement of the present invention, an end portion of the connecting cavity is also provided with an annular positioning protrusion, and the main body of toothbrush head is provided with an annular positioning groove. The positioning protrusion is connected to the positioning groove.

As an improvement of the present invention, the main body of toothbrush head further includes a first mounting part, and the first mounting opening is defined in the first mounting part. The electric toothbrush head also includes a metal sleeving ring. A second mounting opening is defined in the metal sleeving ring. The second mounting opening is in communication with the first insertion channel. An inner wall of the first mounting part is provided with a first mounting groove, and the metal sleeving ring is inserted into the first mounting groove. The electric toothbrush head also includes a decorative ring. A sleeving opening is defined in the decorative ring. An outer wall of the first mounting part is provided with a second mounting groove. The decorative ring is sleeved into the second mounting groove through the sleeving opening. The decorative ring presses the first mounting part against the metal sleeving ring.

As an improvement of the present invention, the main body of toothbrush head is provided with bristle mounting holes, and the bristles are installed in the bristle mounting holes. An outer side wall of the main body of toothbrush head is provided with a first anti-slip protrusion and a first anti-slip groove. The first anti-slip protrusion is arranged around the outer side wall of the main body of toothbrush head in a circumferential direction. The first anti-slip groove is longitudinally arranged along the outer side wall of the main body of toothbrush head. The first anti-slip groove is a cone-shaped first anti-slip groove. The connecting cavity is a POM plastic connecting cavity, the main body of toothbrush head is a PP plastic main body of toothbrush head, and the connecting part is a PP plastic connecting part. The first plastic body is a first POM plastic body, and the second plastic body is a second PP plastic body.

A manufacturing method for an electric toothbrush head is further provided in the present invention. The manufacturing method includes:

Providing a first plastic body and a first mold, wherein the first plastic body is injected into the first mold and solidified to form a connecting cavity, a side wall of the connecting cavity surrounds and forms a first insertion channel, and the first insertion channel is used for insertion of a drive shaft of an electric toothbrush;

Providing a second mold, wherein the second mold is equipped with a positioning slider pin, the connecting cavity is taken out from the first mold and put into the second mold, and the positioning slider pin is inserted into the first insertion channel;

Providing a second plastic body, wherein the second plastic body is injected into the second mold, at least one part of the second plastic body is attached to the connecting cavity to form an attachment part, the second plastic body is solidified to form a main body of toothbrush head, the attachment part is solidified to form a connecting part, and the main body of toothbrush head is connected to the connecting cavity through the connecting part, so that the main body of toothbrush head encloses the connecting cavity;

Detaching the main body of toothbrush head and the connecting cavity from the second mold and the positioning slider pin to obtain a toothbrush rod;

Providing bristles, wherein the bristles are installed onto the toothbrush rod to obtain the electric toothbrush head.

As an improvement of the present invention, a melting point of the connecting cavity is greater than a melting point of the main body of toothbrush head and a melting point of the connecting part. A melting point of the first plastic body is greater than a melting point of the second plastic body.

Beneficial effects of the present invention are as follows. The electric toothbrush head is provided in the present invention. The electric toothbrush head includes the connecting cavity, the connecting part, the bristles, and the main body of toothbrush head. The connecting cavity is positioned within an inner cavity, and the connecting cavity is integrally formed by injection molding. The first insertion channel is surrounded and formed by the side wall of the connecting cavity. The first insertion channel is used for the insertion of the drive shaft of the electric toothbrush. The main body of toothbrush head is connected to the bristles. The main body of toothbrush head is connected to the connecting cavity through the connecting part. The main body of toothbrush head and the connecting part are integrally formed by injection molding. When the main body of toothbrush head is formed by injection molding, at least one part of the main body of toothbrush head is attached to the connecting cavity to form the connecting part. Therefore, the drive shaft of the electric toothbrush can be inserted into the first insertion channel of the connecting cavity, the drive shaft of the electric toothbrush can be tightly connected to the main body of toothbrush head through the connecting cavity, and high-frequency mechanical vibration energy of the drive shaft of the electric toothbrush can be effectively transferred to the main body of toothbrush head through the connecting cavity, thereby not only driving the bristles on the main body of toothbrush head to produce high-frequency vibration and oscillation to achieve a teeth cleaning and whitening effect of the electric toothbrush head, but also reducing noise generated during the transmission of high-frequency vibration to the main body of toothbrush head by mechanical movement of the drive shaft. Moreover, the connecting cavity is integrally formed by injection molding, and when the main body of toothbrush head is formed by injection molding, at least one part of the main body of toothbrush head is attached to the connecting cavity to form the connecting part, so that the main body of toothbrush head is combined with the connecting cavity through the connecting part to form an integral whole. This not only effectively realizes the connection between the main body of toothbrush head and the connecting cavity, but also makes it more stable and integrally stronger compared with other connection methods. At the same time, the connection between the connecting cavity and the toothbrush head is more tight, so that the high-frequency mechanical vibration energy of the drive shaft of the electric toothbrush can be better transmitted to the main body of toothbrush head through the connecting cavity, thereby improving the transmission efficiency, enhancing a vibration effect of the main body of toothbrush head, and further improving the teeth cleaning and whitening effect of the electric toothbrush head.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

FIG. 10 is a schematic diagram of an overall process of a manufacturing method of an electric toothbrush head.

DETAILED DESCRIPTION OF THE EMBODIMENTS

Figure 1:
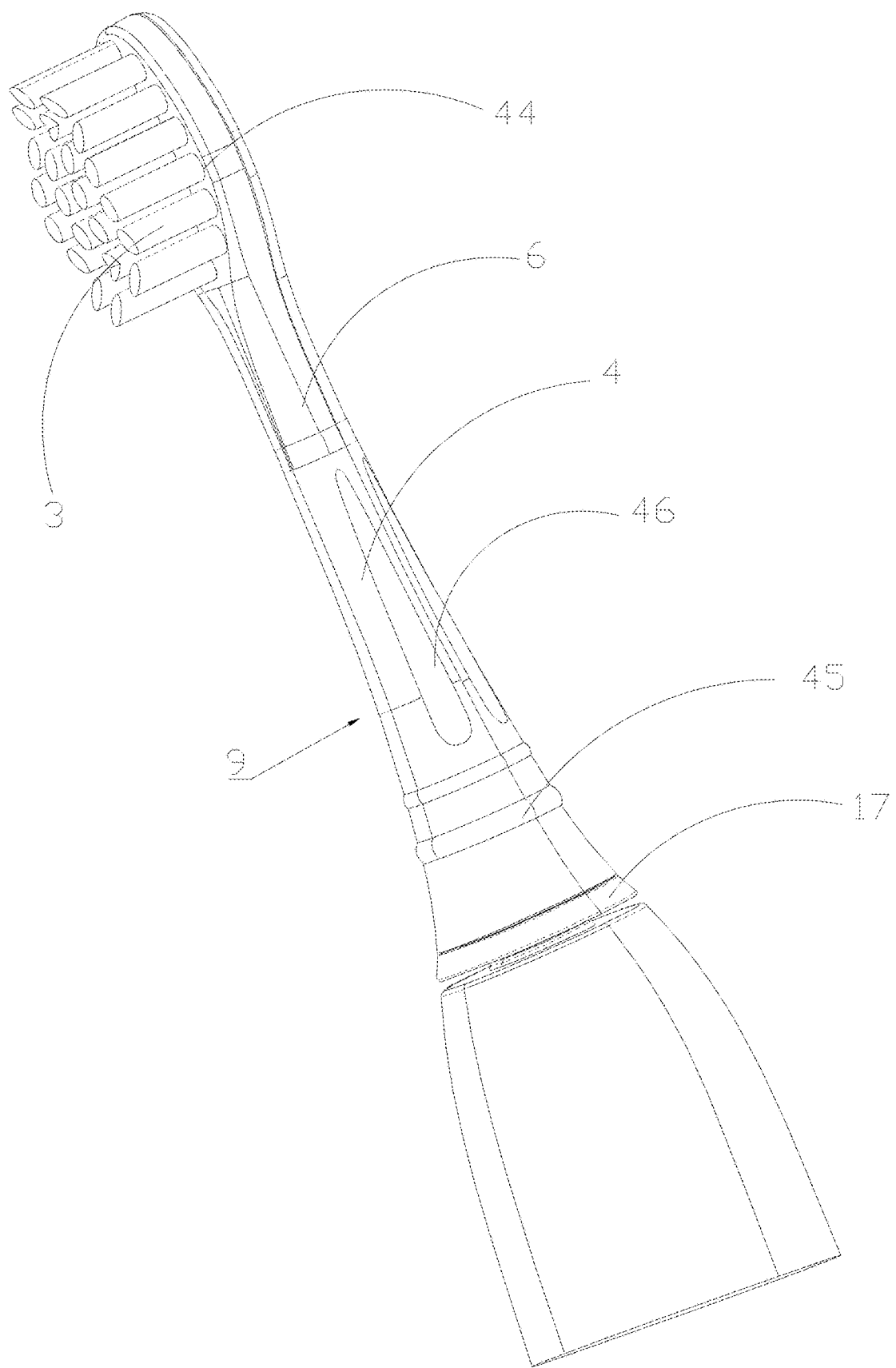
FIG. 1 is a schematic diagram of an overall structure when a drive shaft of an electric toothbrush is inserted into a connecting cavity.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
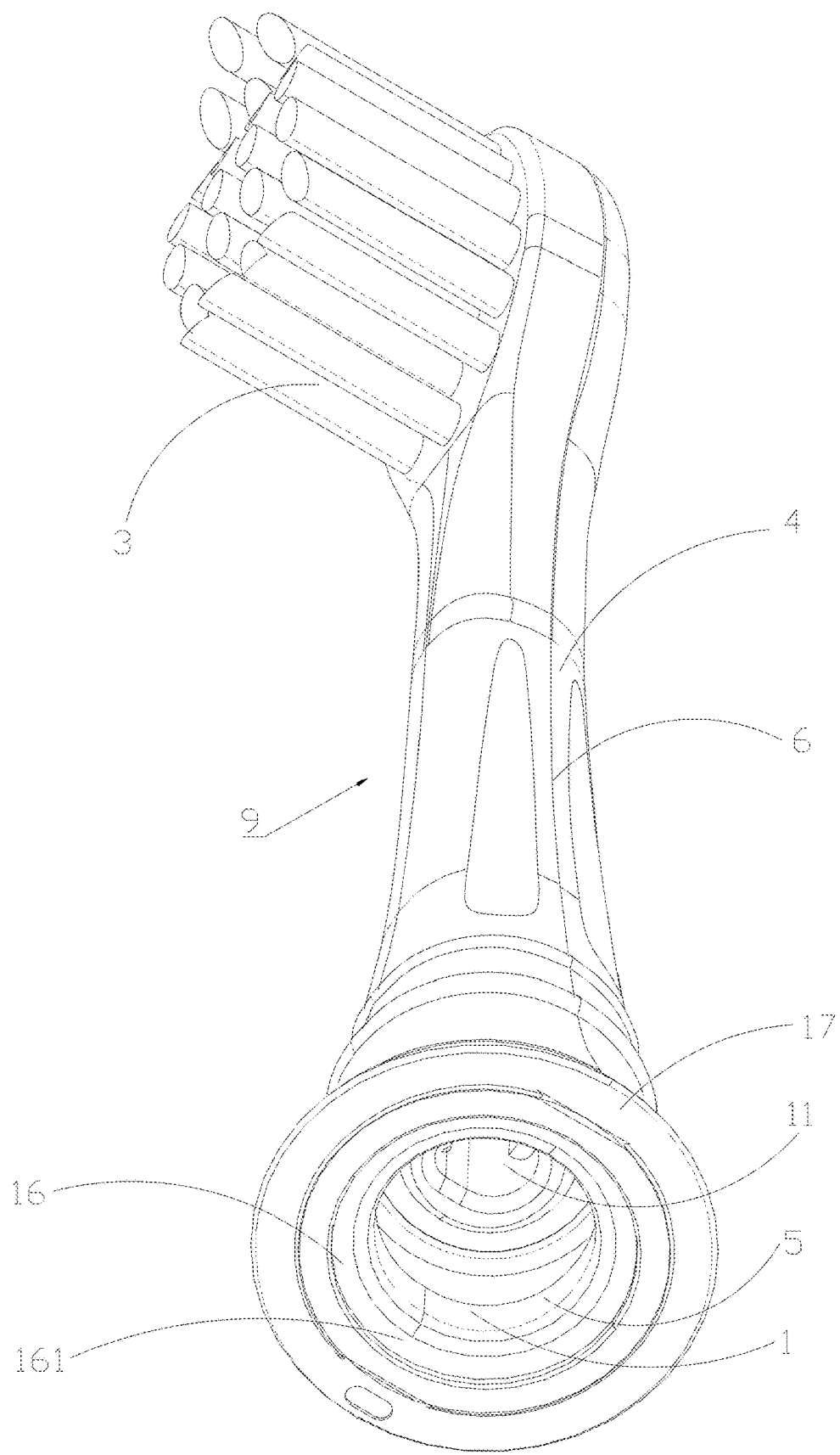
FIG. 2 is a structural diagram of an electric toothbrush head.
Figure 3:
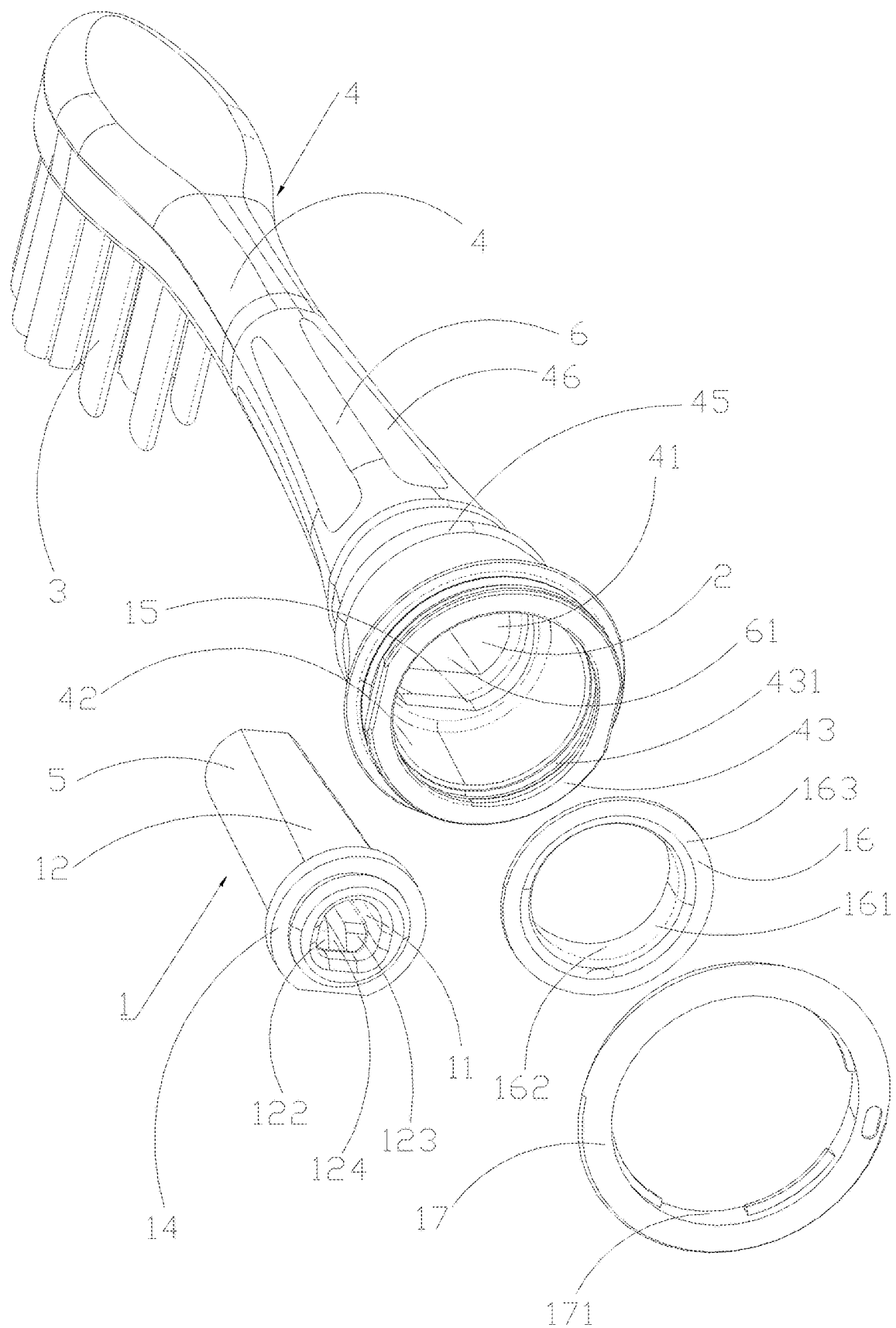
FIG. 3 is an exploded view of an electric toothbrush head.
Figure 4:
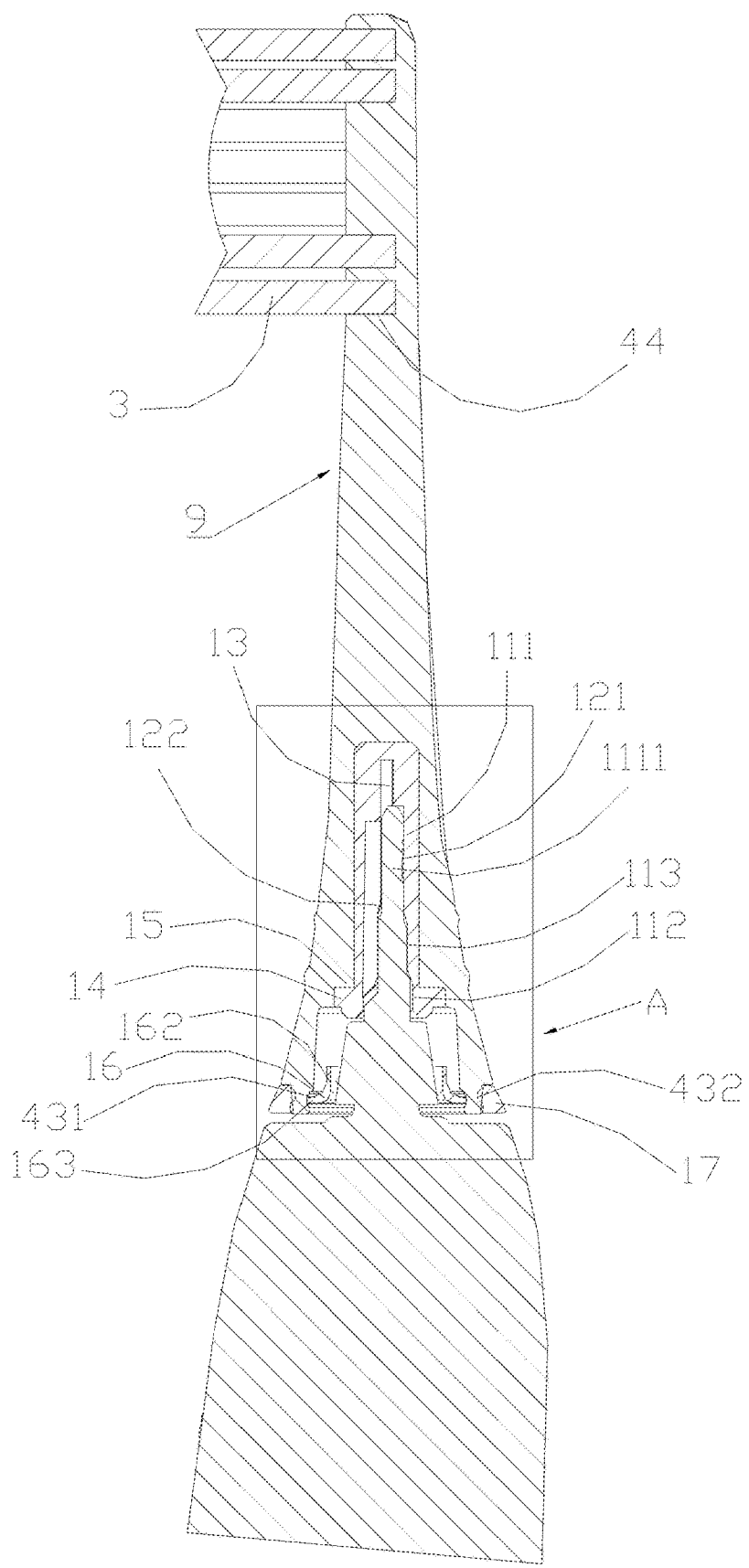
FIG. 4 is a sectional view cut along a main body of toothbrush head and a connecting cavity when a drive shaft of an electric toothbrush is inserted into a connecting cavity.
Figure 5:
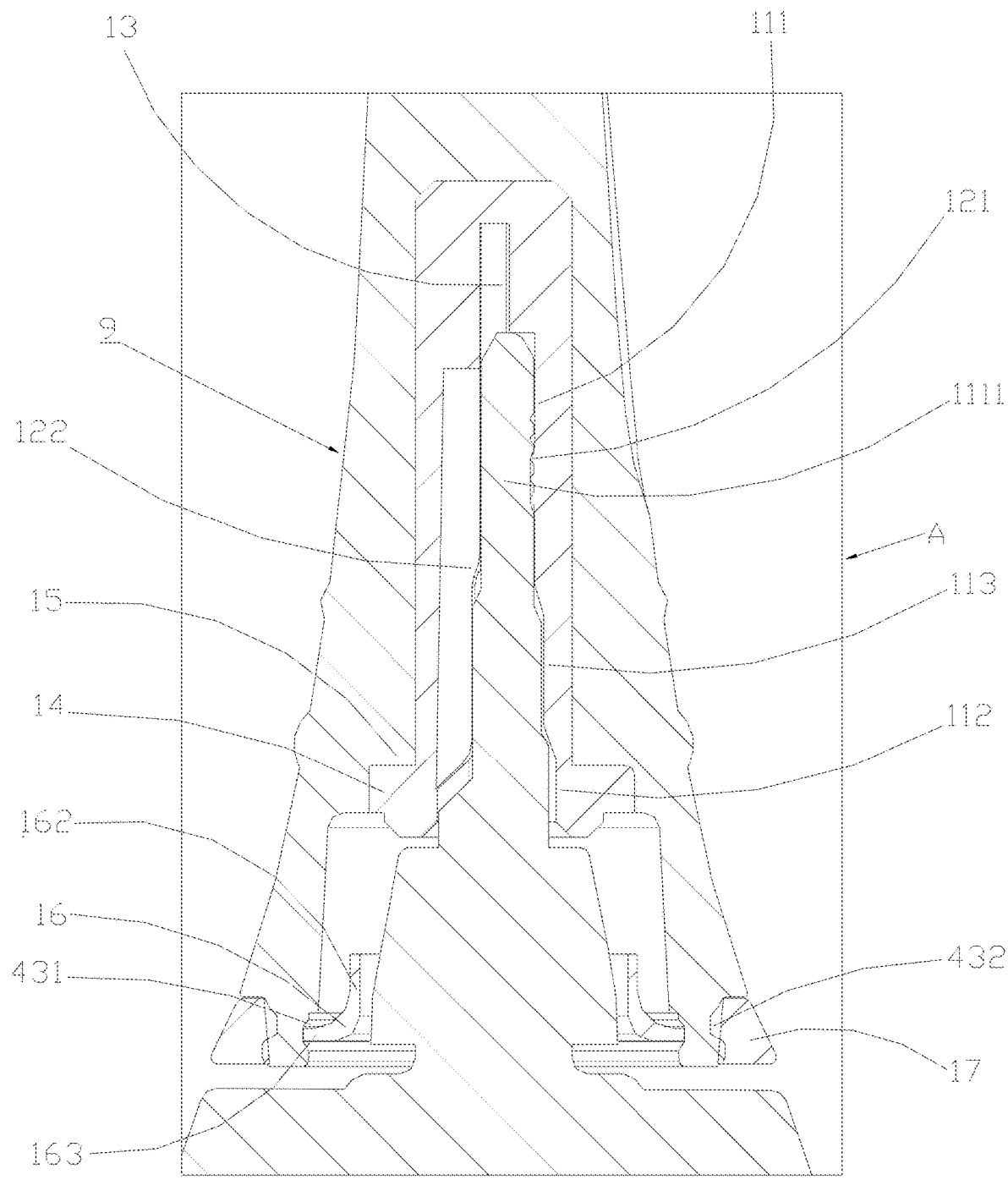
FIG. 5 is an enlarged view of area A in FIG. 4.
Figure 6:
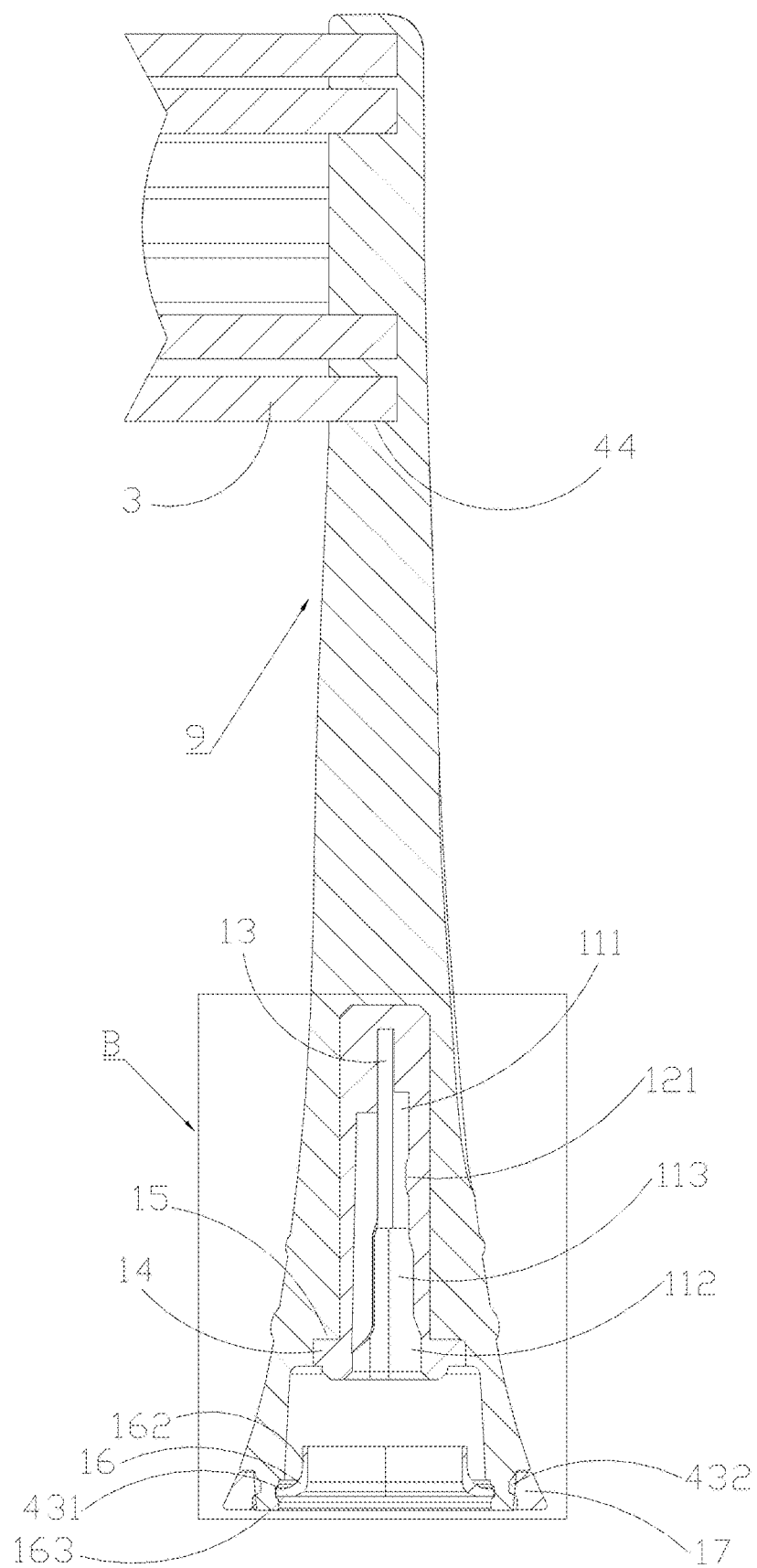
FIG. 6 is a sectional view cut along a main body of toothbrush head and a connecting cavity.
Figure 7:
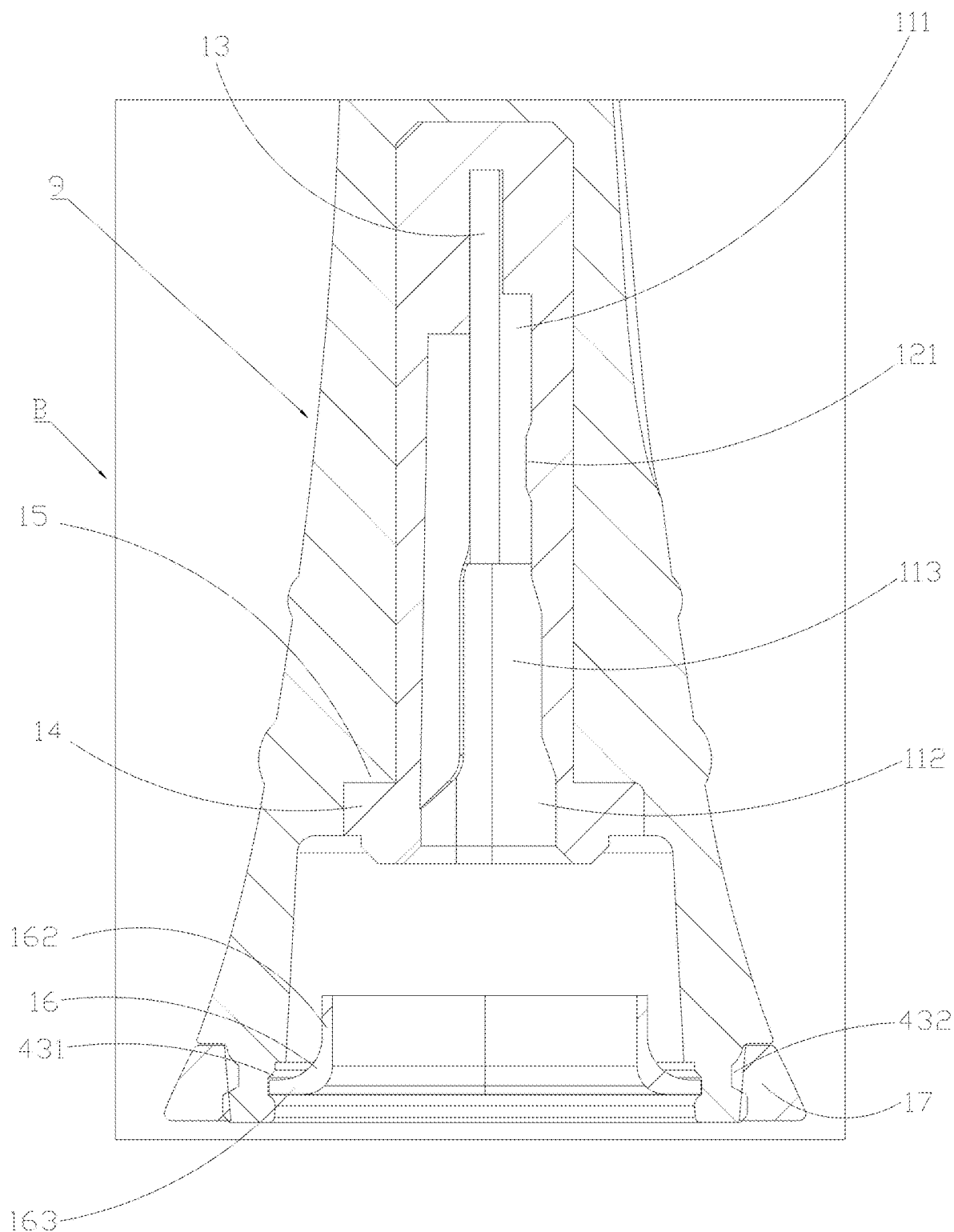
FIG. 7 is an enlarged view of area B in FIG. 6.
Figure 8:
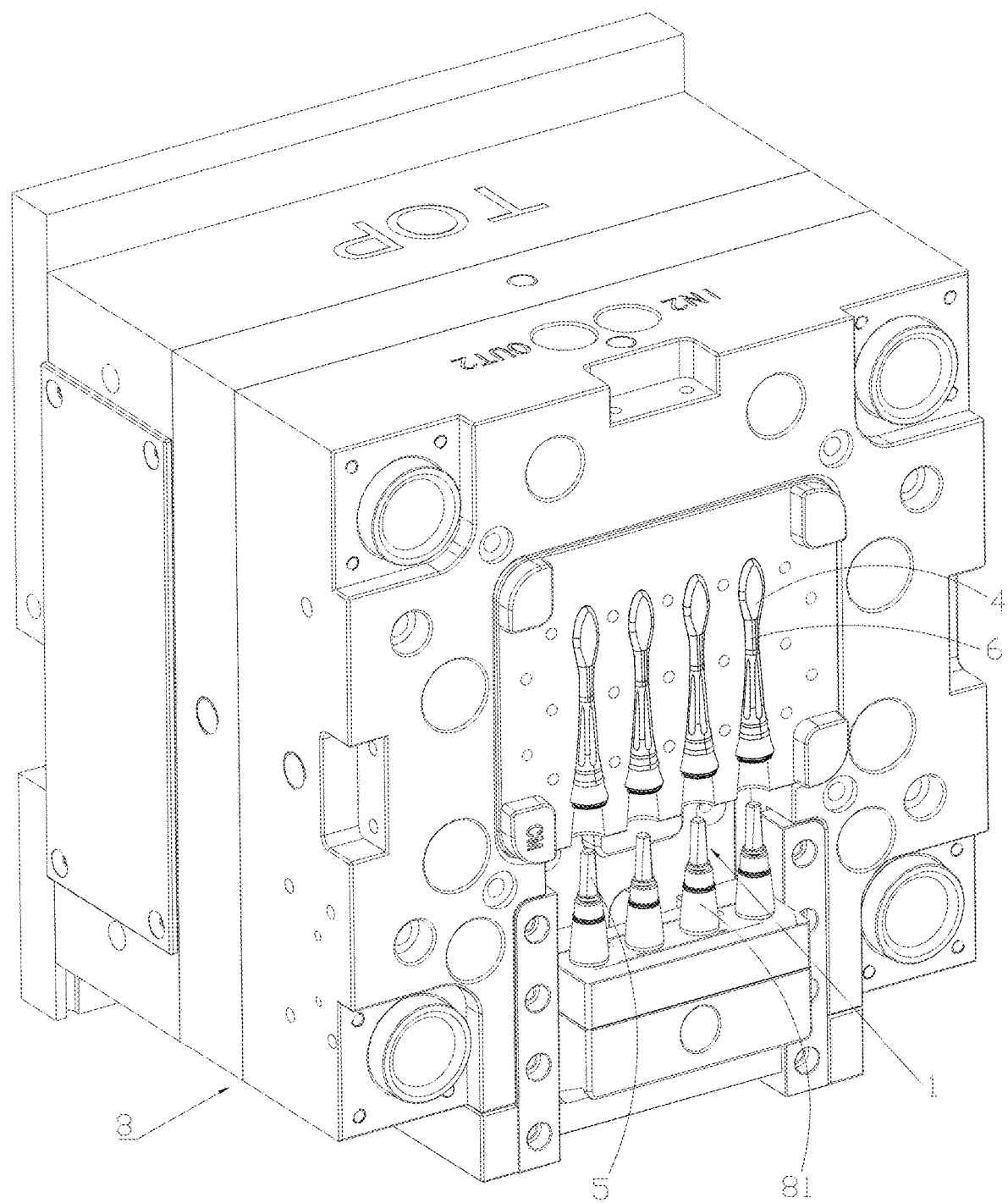
FIG. 8 is a structural diagram of a second mold and a positioning slider pin.
Figure 9:
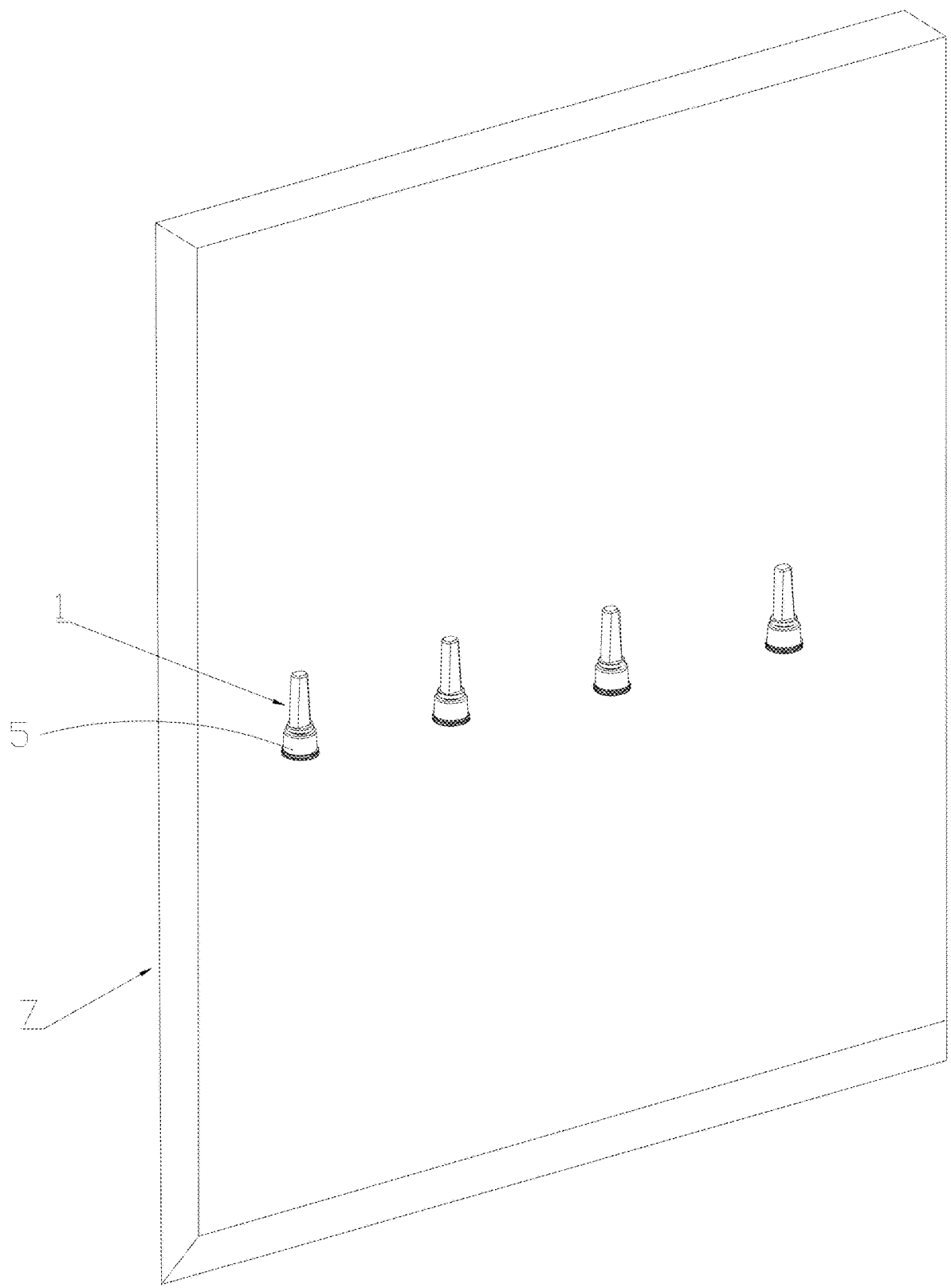
FIG. 9 is a structural diagram of a first mold.

Referring to FIGS. 1-10, an electric toothbrush head includes a connecting cavity 1, a connecting part 2, bristles 3, and a main body 4 of toothbrush head.

The connecting cavity 1 is integrally formed by injection molding. A first insertion channel 11 is surrounded and formed by a side wall of the connecting cavity 1. The first insertion channel 11 is used for insertion of a drive shaft 1111 of an electric toothbrush.

The main body 4 of toothbrush head is connected to the bristles 3. The main body 4 of toothbrush head is connected to the connecting cavity 1 through the connecting part 2. The main body 4 of toothbrush head and the connecting part 2 are integrally formed by injection molding. When the main body 4 of toothbrush head is formed by injection molding, at least one part of the main body 4 of toothbrush head is attached to the connecting cavity 1 to form the connecting part 2.

Through the above structure, the electric toothbrush head includes the connecting cavity 1, the connecting part 2, the bristles 3, and the main body 4 of toothbrush head. The connecting cavity 1 is positioned within an inner cavity, and the connecting cavity 1 is integrally formed by injection molding. The first insertion channel 11 is surrounded and formed by a side wall of the connecting cavity 1. The first insertion channel 11 is used for the insertion of the drive shaft 1111 of the electric toothbrush. The main body 4 of toothbrush head is connected to the bristles 3. The main body 4 of toothbrush head is connected to the connecting cavity 1 through the connecting part 2. The main body 4 of toothbrush head and the connecting part 2 are integrally formed by injection molding. When the main body 4 of toothbrush head is formed by injection molding, at least one part of the main body 4 of toothbrush head is attached to the connecting cavity 1 to form the connecting part 2. Therefore, the drive shaft 1111 of the electric toothbrush can be inserted into the first insertion channel 11 of the connecting cavity 1, the drive shaft 1111 of the electric toothbrush can be tightly connected to the main body 4 of toothbrush head through the connecting cavity 1, and high-frequency mechanical vibration energy of the drive shaft 1111 of the electric toothbrush can be effectively transferred to the main body 4 of toothbrush head through the connecting cavity 1, thereby not only driving the bristles 3 on the main body 4 of toothbrush head to produce high-frequency vibration and oscillation to achieve a teeth cleaning and whitening effect of the electric toothbrush head, but also reducing noise generated during the transmission of high-frequency vibration by mechanical movement of the drive shaft 1111 to the main body 4 of toothbrush head. Moreover, the connecting cavity 1 is integrally formed by injection molding, and when the main body 4 of toothbrush head is formed by injection molding, at least one part of the main body 4 of toothbrush head is attached to the connecting cavity 1 to form the connecting part 2, so that the main body 4 of toothbrush head is combined with the connecting cavity 1 through the connecting part 2 to form an integral whole, thereby not only effectively realizing the connection between the main body 4 of toothbrush head and the connecting cavity 1, but also making it more stable and integrally stronger compared with other connection methods. At the same time, the connection between the connecting cavity 1 and the toothbrush head is more tight, so that the high-frequency mechanical vibration energy of the drive shaft 1111 of the electric toothbrush can be better transmitted to the main body 4 of toothbrush head through the connecting cavity 1, thereby improving transmission efficiency, enhancing a vibration effect of the main body 4 of toothbrush head, and further improving the teeth cleaning and whitening effect of the electric toothbrush head.

In this embodiment, the electric toothbrush head further includes a first plastic body 5, and the connecting cavity 1 is formed by injection molding and solidifying the first plastic body 5. The electric toothbrush head also includes a second plastic body 6, and the main body 4 of toothbrush head is formed by injection molding and solidifying the second plastic body 6. At least one part of the second plastic body 6 is attached to the connecting cavity 1 to form an attachment part 61. The attachment part 61 is solidified with the main body 4 of toothbrush head to form the connecting part 2. Through the above structure, the molding of the main body 4 of toothbrush head and the connecting cavity 1 is effectively achieved. While molding the main body 4 of toothbrush head, the main body 4 of toothbrush head is connected to the connecting cavity 1 form an integral whole through plastic wrapping, so that the connection between the connecting cavity 1 and the toothbrush head is tighter, and the high-frequency mechanical vibration energy of the drive shaft 1111 of the electric toothbrush can be better transmitted to the main body 4 of toothbrush head through the connecting cavity 1, thereby improving the transmission efficiency, enhancing the vibration effect of the main body 4 of toothbrush head, and further improving the teeth cleaning and whitening effect of the electric toothbrush head.

In this embodiment, a melting point of the connecting cavity 1 is greater than a melting point of the main body 4 of toothbrush head and a melting point of the connecting part 2. A melting point of the first plastic body 5 is greater than a melting point of the second plastic body 6. Through the above structure, by utilizing the characteristic that the melting point of the connecting cavity 1 is greater than the melting point of the main body 4 of toothbrush head, the connecting cavity 1 will not be melted during the molding of the main body 4 of toothbrush head, so as to connect the main body 4 of toothbrush head and the connecting cavity 1 to form an integral whole through plastic wrapping while molding the main body 4 of toothbrush head.

In this embodiment, the main body 4 of toothbrush head is provided with a first accommodating cavity 41 and a first mounting opening 42. The first mounting opening 42 is in communication with the first accommodating cavity 41, and the first accommodating cavity 41 is surrounded and formed by a side wall of the main body 4 of toothbrush head. The connecting part 2 is positioned on an inner surface of the first accommodating cavity 41, the connecting cavity 1 is positioned inside the first accommodating cavity 41, and the connecting cavity 1 is connected to the inner surface of the first accommodating cavity 41 through the connecting part 2. The first mounting opening 42 is in communication with the first insertion channel 11. Through the above structure, the drive shaft 1111 of the electric toothbrush can be inserted into the first insertion channel 11 of the connecting cavity 1 through the first mounting opening 42, so that the drive shaft 1111 of the electric toothbrush can be tightly connected to the main body 4 of toothbrush head through the connecting cavity 1, and the high-frequency mechanical vibration energy of the drive shaft 1111 of the electric toothbrush is effectively transmitted to the main body 4 of toothbrush head through the connecting cavity 1, thereby not only driving the bristles 3 on the main body 4 of toothbrush head to produce high-frequency vibration and oscillation to achieve the teeth cleaning and whitening effect of the toothbrush, but also reducing the noise generated during the transmission of high-frequency vibration by mechanical movement of the drive shaft 1111 to the main body 4 of toothbrush head.

In this embodiment, the connecting cavity 1 is equipped with an elastic wall 12, and an inner surface of the elastic wall 12 is used for clamping the drive shaft 1111 of the electric toothbrush in the first insertion channel 11. The inner surface of the elastic wall 12 is provided with a first locking protrusion 121. Specifically, the first insertion channel 11 includes a relatively narrow front portion and a relatively wide back portion, so that a narrower first insertion part 111 is formed at a front end of the first insertion channel 11, a wider second insertion part 112 is formed at a rear end of the first insertion channel 11, and an inner diameter of the second insertion part 112 is greater than an inner diameter of the first insertion part 111. Furthermore, the first insertion channel 11 also includes a third insertion part 113. The third insertion part 113 is positioned between the first insertion part 111 and the second insertion part 112. An inner diameter of the third insertion part 113 is greater than the inner diameter of the first insertion part 111, and the inner diameter of the third insertion part 113 is smaller than the inner diameter of the second insertion part 112. Furthermore, the inner surface of the elastic wall 12 is provided with the first locking protrusion 121. The first locking protrusion 121 is positioned on an inner surface of the first insertion part 111. Furthermore, the inner surface of the elastic wall 12 is also provided with a first position limiting protrusion 122 and a second position limiting protrusion 123. The first locking protrusion 121, the first position limiting protrusion 122, and the second position limiting protrusion 123 are used for clamping the drive shaft 1111 of the electric toothbrush in the first insertion channel 11. Furthermore, a first avoidance groove 124 is defined between the first position limiting protrusion 122 and the second position limiting protrusion 123. Furthermore, the first position limiting protrusion 122, the second position limiting protrusion 123, and the first avoidance groove 124 all extend between the first insertion part 111, the second insertion part 112, and the third insertion part 113. Furthermore, the first position limiting protrusion 122 includes a relatively high front portion and a relatively low back portion. A front end of the first position limiting protrusion 122 is positioned at the first insertion part 111. The second position limiting protrusion 123 includes a relatively high front portion and a relatively low back portion. A front end of the second position limiting protrusion 123 is positioned at the first insertion part 111. Furthermore, the connecting cavity 1 is also provided with an avoidance hole position 13. The avoidance hole position 13 is in communication with the first insertion channel 11, and the first insertion part 111 is positioned between the avoidance hole position 13 and the third insertion part 113. Through the above structure, when the drive shaft 1111 is inserted into the first insertion channel 11, the drive shaft 1111 presses against the elastic wall 12. Due to the presence of the first avoidance groove 124 and the avoidance hole position 13, the elastic wall 12 can be stretched by the drive shaft 1111 to undergo elastic deformation. When the elastic wall 12 of the connecting cavity 1 undergoes elastic deformation, an elastic restoring force is provided, and the drive shaft 1111 of the electric toothbrush inserted into the first insertion channel 11 will be pressed and clamped within the first insertion channel 11 by the elastic restoring force, so that the drive shaft 1111 of the electric toothbrush can be tightly connected to the main body 4 of toothbrush head through the connecting cavity 1, the first insertion channel 11 of the connecting cavity 1 can be tightly pressed against the drive shaft 1111 to achieve desired tightness, and the high-frequency mechanical vibration energy of the drive shaft 1111 of the electric toothbrush can be effectively transferred to the main body 4 of toothbrush head, thereby not only driving the bristles 3 on the main body 4 of toothbrush head to produce high-frequency vibration and oscillation to achieve the teeth cleaning and whitening effect of the toothbrush, but also reducing the noise generated during the transmission of high-frequency vibration to the main body 4 of toothbrush head by the mechanical movement of the drive shaft 1111. Moreover, the first insertion part 111, the second insertion part 112, and the third insertion part 113 can be tightly pressed against a front portion, a middle portion, and a rear portion of the drive shaft 1111 of the electric toothbrush to achieve the desired tightness, effectively transferring the high-frequency mechanical vibration energy of the drive shaft 1111 of the electric toothbrush to the main body 4 of toothbrush head, driving the bristles 3 on the main body 4 of toothbrush head to produce high-frequency vibration and oscillation, thereby achieving the teeth cleaning and whitening effect.

In this embodiment, an end portion of the connecting cavity 1 is also provided with an annular positioning protrusion 14, and the main body 4 of toothbrush head is provided with an annular positioning groove 15. The positioning protrusion 14 is connected to the positioning groove 15. Through the above structure, due to the connection between the positioning protrusion 14 and the positioning groove 15, the main body 4 of toothbrush head can be precisely connected to the connecting cavity 1 during injection molding.

In this embodiment, the main body 4 of toothbrush head further includes a first mounting part 43, and the first mounting opening 42 is defined in the first mounting part 43. The electric toothbrush head also includes a metal sleeving ring 16. A second mounting opening 161 is defined in the metal sleeving ring 16. The second mounting opening 161 is in communication with the first insertion channel 11. An inner wall of the first mounting part 43 is provided with a first mounting groove 431, and the metal sleeving ring 16 is inserted into the first mounting groove 431. The electric toothbrush head also includes a decorative ring 17. A sleeving opening 171 is defined in the decorative ring 17. An outer wall of the first mounting part 43 is provided with a second mounting groove 432. The decorative ring 17 is sleeved into the second mounting groove 432 through the sleeving opening 171. The decorative ring 17 presses the first mounting part 43 against the metal sleeving ring 16. Specifically, the metal sleeving ring 16 is equipped with a first connecting side wall 162 and a second connecting side wall 163. The first connecting side wall 162 is connected to the second connecting side wall 163. The first connecting side wall 162 and the second connecting side wall 163 are arranged at a right angle, an obtuse angle, or an acute angle. The first connecting side wall 162 is inserted into the first mounting groove, and the second connecting side wall 163 surrounds and forms the second mounting opening. The main body 4 of toothbrush head is provided with bristle mounting holes 44, and the bristles 3 are installed in the bristle mounting holes 44. An outer side wall of the main body 4 of toothbrush head is provided with a first anti-slip protrusion 45 and a first anti-slip groove 46. The first anti-slip protrusion 45 is arranged around the outer side wall of the main body 4 of toothbrush head in a circumferential direction. The first anti-slip groove 46 is longitudinally arranged along the outer side wall of the main body 4 of toothbrush head. The first anti-slip groove 46 is a cone-shaped first anti-slip groove 46. Specifically, the connecting cavity 1 is a POM plastic connecting cavity 1, the main body 4 of toothbrush head is a PP plastic main body 4 of toothbrush head, and the connecting part 2 is a PP plastic connecting part 2. The first plastic body 5 is a first POM plastic body, and the second plastic body 6 is a second PP plastic body. Furthermore, a melting point of the connecting cavity 1 and a melting point of the first plastic body 5 are greater than 165 degrees Celsius. A melting point of the main body 4 of toothbrush head, a melting point of the connecting part 2, and a melting point of the second plastic body 6 are less than or equal to 165 degrees Celsius. Furthermore, the melting point of the connecting cavity 1 and the melting point of the first plastic body 5 are 175 degrees Celsius. The melting point of the main body 4 of toothbrush head, the melting point of the connecting part 2, and the melting point of the second plastic body 6 are 165 degrees Celsius. Through the above structure, the decorative ring 17 can make an appearance of the toothbrush head more beautiful, and since the decorative ring 17 presses the first mounting part 43 against the metal sleeving ring 16, the first mounting part 43 and the first mounting opening 42 can be effectively prevented form deformation, and the strength of the main body 4 of toothbrush head can be improved. The drive shaft 1111 of the electric toothbrush head sequentially passes through the first mounting opening 42 and the second mounting opening 161, and then is inserted into the first insertion channel 11. The elastic wall 12 tightly presses the drive shaft 1111 within the first insertion channel 11.

Referring to FIGS. 1-10, a method for manufacturing an electric toothbrush head includes the following steps.

In step S10, a first plastic body 5 and a first mold 7 are provided, the first plastic body 5 is injected into the first mold 7 and solidified to form a connecting cavity 1, a side wall of the connecting cavity 1 surrounds and forms a first insertion channel 11, and the first insertion channel 11 is used for insertion of a drive shaft 1111 of the electric toothbrush.

In step S11, a second mold 8 is provided, the second mold 8 is equipped with a positioning slider pin 81, the connecting cavity 1 is taken out from the first mold 7 and put into the second mold 8, and the positioning slider pin 81 is inserted into the first insertion channel 11.

In step S12, a second plastic body 6 is provided, the second plastic body 6 is injected into the second mold 8, at least one part of the second plastic body 6 is attached to the connecting cavity 1 to form an attachment part 61, the second plastic body 6 is solidified to form a main body 4 of toothbrush head, the attachment part 61 is solidified to form a connecting part 2, and the main body 4 of toothbrush head is connected to the connecting cavity 1 through the connecting part 2, so that the main body 4 of toothbrush head encloses the connecting cavity 1.

In step S13, the main body 4 of toothbrush head and the connecting cavity 1 are detached from the second mold 8 and the positioning slider pin 81 to obtain a toothbrush rod 9.

In step S14, bristles 3 are provided, and the bristles 3 are installed onto the toothbrush rod 9 to obtain the electric toothbrush head.

Through the above steps, the drive shaft 1111 of the electric toothbrush can be inserted into the first insertion channel 11 of the connecting cavity 1, so that the drive shaft 1111 of the electric toothbrush can be tightly connected to the main body 4 of toothbrush head through the connecting cavity 1, and high-frequency mechanical vibration energy of the drive shaft 1111 of the electric toothbrush can be effectively transmitted to the main body 4 of toothbrush head through the connecting cavity 1, thereby not only driving the bristles 3 on the main body 4 of toothbrush head to produce high-frequency vibration and oscillation to achieve a teeth cleaning and whitening effect of the toothbrush, but also reducing noise generated during the transmission of high-frequency vibration by mechanical movement of the drive shaft 1111 to the main body 4 of toothbrush head. Moreover, since the connecting cavity 1 is integrally formed by injection molding, when the main body 4 of toothbrush head is formed by injection molding, at least one part of the main body 4 of toothbrush head is attached to the connecting cavity 1 to form the connecting part 2, so that the main body 4 of toothbrush head is combined with the connecting cavity 1 through the connecting part 2 to form an integral whole. This not only effectively realizes the connection between the main body 4 of toothbrush head and the connecting cavity 1, but also makes it more stable and integrally stronger compared with other connection methods. At the same time, the connection between the connecting cavity 1 and the toothbrush head is more tight, which can better transmit the high-frequency mechanical vibration energy of the drive shaft 1111 of the electric toothbrush to the main body 4 of toothbrush head through the connecting cavity 1, thereby improving transmission efficiency, enhancing a vibration effect of the main body 4 of toothbrush head, and further improving a teeth cleaning and whitening effect of the electric toothbrush head. Moreover, the molding of the main body 4 of toothbrush head and the connecting cavity 1 is effectively achieved. While molding the main body 4 of toothbrush head, the main body 4 of toothbrush head is connected to the connecting cavity 1 to form an integral whole through plastic wrapping, so that the connection between the connecting cavity 1 and the toothbrush head more tight, the high-frequency mechanical vibration energy of the drive shaft 1111 of the electric toothbrush can be better transmitted to the main body 4 of toothbrush head through the connecting cavity 1, thereby improving the transmission efficiency, enhancing the vibration effect of the main body 4 of toothbrush head, and further improving the teeth cleaning and whitening effect of the electric toothbrush head.

In this embodiment, a melting point of the connecting cavity 1 is greater than a melting point of the main body 4 of toothbrush head and a melting point of the connecting part 2. A melting point of the first plastic body 5 is greater than a melting point of the second plastic body 6. Through the above structure, by utilizing the characteristic that the melting point of the connecting cavity 1 is greater than the melting point of the main body 4 of toothbrush head, the connecting cavity 1 will not be melted during the molding of the main body 4 of toothbrush head, so that the main body 4 of toothbrush head and the connecting cavity 1 can be connected to form an integral whole through plastic wrapping while molding the main body 4 of toothbrush head.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. An electric toothbrush head, comprising:
   a connecting cavity, wherein the connecting cavity is integrally formed by injection molding, a first insertion channel is surrounded and formed by a side wall of the connecting cavity, and the first insertion channel is used for insertion of a drive shaft of an electric toothbrush;
   a connecting part;
   bristles; and
   a main body of toothbrush head, wherein the main body of toothbrush head is connected to the bristles; the main body of toothbrush head is connected to the connecting cavity through the connecting part, and the main body of toothbrush head and the connecting part are integrally formed by injection molding; when the main body of toothbrush head is formed by injection molding, at least one part of the main body of toothbrush head is attached to the connecting cavity to form the connecting part;
   wherein the main body of toothbrush head is provided with a first accommodating cavity and a first mounting opening, the first accommodating cavity is in communication with the first mounting opening, and is arranged farther away from an end surface of the main body of toothbrush head relative to the first mounting opening, and the first accommodating cavity is surrounded and formed by a side wall of the main body of toothbrush head;
   the connecting part is positioned on an inner surface of the first accommodating cavity, the connecting cavity is totally positioned inside the first accommodating cavity, and the connecting cavity is connected to the inner surface of the first accommodating cavity through the connecting part;
   the first mounting opening is in communication with the first insertion channel, and the first mounting opening is configured to allow part of the drive shaft of an electric toothbrush pass therethrough to extend into the first insertion channel.

2. The electric toothbrush head according to claim 1, wherein the electric toothbrush head further comprises a first plastic body, and the connecting cavity is formed by injection molding and solidifying the first plastic body; the electric toothbrush head also comprises a second plastic body, the main body of toothbrush head is formed by injection molding and solidifying the second plastic body, at least one part of the second plastic body is attached to the connecting cavity to form an attachment part, and the attachment part is solidified with the main body of toothbrush head to form the connecting part.

3. He electric toothbrush head according to claim 2, wherein a melting point of the first plastic body is greater than a melting point of the second plastic body.

4. The electric toothbrush head according to claim 2, wherein the main body of toothbrush head is provided with bristle mounting holes, and the bristles are installed in the bristle mounting holes; an outer side wall of the main body of toothbrush head is provided with a first anti-slip protrusion and a first anti-slip groove, the first anti-slip protrusion is arranged around the outer side wall of the main body of toothbrush head in a circumferential direction; the first anti-slip groove is longitudinally arranged along the outer side wall of the main body of toothbrush head; the first anti-slip groove is a cone-shaped first anti-slip groove.

5. He electric toothbrush head according to claim 1, wherein a melting point of the connecting cavity is greater than a melting point of the main body of toothbrush head and a melting point of the connecting part.

6. The electric toothbrush head according to claim 1, wherein the connecting cavity is equipped with an elastic wall, and an inner surface of the elastic wall is used for clamping the drive shaft of the electric toothbrush in the first insertion channel.

7. The electric toothbrush head according to claim 6, wherein the inner surface of the elastic wall is provided with a first locking protrusion.

8. The electric toothbrush head according to claim 6, wherein the first insertion channel comprises a relatively narrow front portion and a relatively wide back portion, so that a narrower first insertion part is formed at a front end of the first insertion channel, a wider second insertion part is formed at a rear end of the first insertion channel, and an inner diameter of the second insertion part is greater than an inner diameter of the first insertion part.

9. The electric toothbrush head according to claim 8, wherein the first insertion channel also comprises a third insertion part, the third insertion part is positioned between the first insertion part and the second insertion part, an inner diameter of the third insertion part is greater than the inner diameter of the first insertion part, and the inner diameter of the third insertion part is smaller than the inner diameter of the second insertion part.

10. The electric toothbrush head according to claim 9, wherein the inner surface of the elastic wall is also provided with a first position limiting protrusion and a second position limiting protrusion; the first locking protrusion, the first position limiting protrusion, and the second position limiting protrusion are used for clamping the drive shaft of the electric toothbrush in the first insertion channel.

11. The electric toothbrush head according to claim 10, wherein a first avoidance groove is defined between the first position limiting protrusion and the second position limiting protrusion.

12. The electric toothbrush head according to claim 11, wherein the first position limiting protrusion, the second position limiting protrusion, and the first avoidance groove all extend between the first insertion part, the second insertion part, and the third insertion part.

13. The electric toothbrush head according to claim 10, wherein the first position limiting protrusion comprises a relatively high front portion and a relatively low back portion, and a front end of the first position limiting protrusion is positioned at the first insertion part; the second position limiting protrusion comprises a relatively high front portion and a relatively low back portion, and a front end of the second position limiting protrusion is positioned at the first insertion part.

14. The electric toothbrush head according to claim 9, wherein the connecting cavity is also provided with an avoidance hole position, the avoidance hole position is in communication with the first insertion channel, and the first insertion part is positioned between the avoidance hole position and the third insertion part.

15. The electric toothbrush head according to claim 8, wherein the inner surface of the elastic wall is provided with a first locking protrusion; and the first locking protrusion is positioned on an inner surface of the first insertion part.

16. The electric toothbrush head according to claim 1, wherein an end portion of the connecting cavity is also provided with an annular positioning protrusion, the main body of toothbrush head is provided with an annular positioning groove, and the positioning protrusion is connected to the positioning groove.

17. The electric toothbrush head according to claim 1, wherein the main body of toothbrush head further comprises a first mounting part, and the first mounting opening is defined in the first mounting part; the electric toothbrush head also comprises a metal sleeving ring, a second mounting opening is defined in the metal sleeving ring, the second mounting opening is in communication with the first insertion channel, an inner wall of the first mounting part is provided with a first mounting groove, and the metal sleeving ring is inserted into the first mounting groove; the electric toothbrush head also comprises a decorative ring, a sleeving opening is defined in the decorative ring, an outer wall of the first mounting part is provided with a second mounting groove, the decorative ring is sleeved into the second mounting groove through the sleeving opening, and the decorative ring presses the first mounting part against the metal sleeving ring.

18. An electric toothbrush head, comprising:
a main body of toothbrush head;
bristles formed on one end of the main body of toothbrush head;
a connecting cavity, wherein the connecting cavity is integrally formed by injection molding, a first insertion channel is surrounded and formed by a side wall of the connecting cavity, and the first insertion channel is used for insertion of a drive shaft of an electric toothbrush;
a metal sleeving ring and a decorative ring;
wherein the main body of toothbrush head is connected to the connecting cavity by injection molding; and
wherein the main body of toothbrush head is provided with a first accommodating cavity and a first mounting opening, the first accommodating cavity is in communication with the first mounting opening, and is arranged farther away from another end of the main body of toothbrush head relative to the first mounting opening, and the first accommodating cavity is surrounded and formed by a side wall of the main body of toothbrush head;
the connecting cavity is totally positioned inside the first accommodating cavity, and the connecting cavity is connected to the inner surface of the first accommodating cavity when the main body of toothbrush head is molded by injection molding;
the first mounting opening is in communication with the first insertion channel, the metal sleeving ring is fixed in the first mounting opening, the decorative ring is sleeved on a side wall of the first mounting opening, and the decorative ring presses the side wall against the metal sleeving ring, and the first mounting opening and the metal sleeving ring are configured to allow the drive shaft of an electric toothbrush pass therethrough to extend into the first insertion channel.

\* \* \* \* \*